United States Patent [19]
Watanabe

[11] Patent Number: 5,490,023
[45] Date of Patent: Feb. 6, 1996

[54] DISK DRIVE APPARATUS HAVING MECHANISM FOR SMOOTHLY EJECTING DISK CARTRIDGE

[75] Inventor: Takashi Watanabe, Ichikawa, Japan

[73] Assignee: TEAC Corp., Japan

[21] Appl. No.: 57,107

[22] Filed: May 3, 1993

[30] Foreign Application Priority Data

May 13, 1992 [JP] Japan .................. 4-031518 U

[51] Int. Cl.⁶ .................. G11B 5/00; G11B 17/04
[52] U.S. Cl. .................. 360/99.06; 369/77.2
[58] Field of Search .................. 360/105, 96.5, 360/97.01, 99.02, 99.06, 99.08; 369/75.1, 75.2, 77.1, 77.2, 178

[56] References Cited

U.S. PATENT DOCUMENTS

| | | | |
|---|---|---|---|
| 4,831,477 | 5/1989 | Sakamoto et al. | 360/99.02 |
| 5,014,258 | 5/1991 | Takemasa et al. | 360/97.01 |
| 5,025,339 | 6/1991 | Kanno et al. | 360/99.06 |
| 5,184,261 | 2/1993 | Noguchi | 360/96.5 |
| 5,222,005 | 6/1993 | Inoue | 360/105 |

FOREIGN PATENT DOCUMENTS

| | | | |
|---|---|---|---|
| 63-206982 | 8/1988 | Japan | 369/178 |
| 123556 | 5/1990 | Japan . | |

Primary Examiner—Robert S. Tupper
Assistant Examiner—Brian E. Miller
Attorney, Agent, or Firm—Andrus, Sceales, Starke & Sawall

[57] ABSTRACT

A disk drive apparatus includes a cartridge in which a disk for storing information is accommodated, a movable holder in which the cartridge is inserted so that an edge of the cartridge is placed at an inserted position, an ejection member rotatably supported for ejecting the cartridge from the holder in an ejecting direction when an ejection button is depressed, so that the cartridge edge is placed at an ejected position, a spring for actuating the ejection member in the ejecting direction, and a braking member for applying a resisting force to the ejection member in a direction opposite to the ejecting direction during the ejecting movement of the cartridge.

10 Claims, 12 Drawing Sheets

DISK DRIVE APPARATUS HAVING MECHANISM FOR SMOOTHLY EJECTING DISK CARTRIDGE

BACKGROUND OF THE INVENTION (1) Field of the Invention

The present invention generally relates to disk drive apparatuses, and more particularly to a disk drive apparatus in which a disk cartridge is inserted into the inside of the apparatus and placed at a recording/reproducing position, and the disk cartridge is ejected by an ejection mechanism from the inside of the apparatus to an outside position.

(2) Description of the Prior Art

In a magnetic disk drive device, an ejection mechanism including a holder, a slider and a latch lever is provided. A disk cartridge accommodating a flexible magnetic disk is inserted in the holder. The latch lever actuated by a spring is connected to the slider before the disk cartridge is inserted. Upon insertion of the disk cartridge in the holder, the leading edge of the cartridge comes into contact with the latch lever, thus releasing the latch lever from the slider. The slider is moved so as to place the disk cartridge at a recording/reproducing position where information can be written to and read from the disk by means of a magnetic head of the disk drive device.

When an ejection button on a front bezel of the disk drive device is depressed by an operator, the slider is moved so as to rotate the latch lever due to the actuating force of the spring. As the latch lever is rotated so as to be connected to the slider, the disk cartridge is moved to an ejecting direction and then ejected from the holder.

In a different disk drive device, a shutter lever drawn by a spring is mounted on the holder such that the shutter of the disk cartridge is opened by the shutter lever after the insertion of the disk cartridge. In this disk drive device, when the ejection button is depressed by an operator, the shutter lever is rotated due to the drawing force of the spring at the same time as the latch lever is rotated to be connected to the slider, so that the disk cartridge is ejected from the holder by the latch lever and the shutter lever.

Generally, it is desirable that the disk cartridge always stops at a prescribed outside position after it is ejected from the holder. At the prescribed outside position, the rear edge of the cartridge is 30–40 mm distant from the front bezel of the disk drive device. If the distance between the cartridge edge and the front bezel after the ejection is smaller than 30 mm, an operator cannot easily take out the disk cartridge using the fingers. If the distance between the cartridge edge and the front bezel after the ejection is greater than 40 mm, it is likely that the disk cartridge will drop from an insertion opening of the front bezel.

In the disk drive devices mentioned above, the resilient forces of the latch lever spring and the shutter lever spring are preset to a relatively great level such that the displacement of the disk cartridge when it is ejected is greater than the movement of the shutter lever (or the movement of the latch lever) in the ejecting direction. Thus, the disk cartridge is further moved beyond the intended outside position in the ejecting direction after it is ejected outside the device, due to the resilient forces of the latch lever spring and the shutter lever spring.

However, in the above mentioned disk drive devices, the latch lever spring and the shutter lever spring have various resilient forces, and the frictional resistance between the cartridge and the holder varies. The ejection position to which the disk cartridge is ejected from the inside of the device is often different from the intended outside position. Occasionally, the disk cartridge leaps out or drops from the insertion opening due to the variation of the spring forces. After extended use of the disk drive device, the spring forces vary and the frictional resistance of the cartridge and the holder varies. Thus, in the conventional disk drive devices, it is difficult to smoothly and stably eject the disk cartridge to the intended outside position.

SUMMARY OF THE INVENTION

Accordingly, it is a general object of the present invention to provide an improved disk drive apparatus in which the above described problems are eliminated.

Another, more specific object of the present invention is to provide a disk drive apparatus having an ejection mechanism which enables the disk cartridge to be smoothly and reliably ejected from the holder to the intended outside position. The above mentioned objects of the present invention are achieved by a disk drive apparatus which includes: a cartridge in which a disk for storing information is accommodated; a movable holder in which the cartridge is inserted to an inserted position; a rotatably supported ejection member for ejecting the cartridge from the holder in an ejecting direction when an ejection button is depressed, so that an edge of the cartridge is placed at an ejected position, a spring connected to the ejection member for actuating the ejection member in the ejecting direction due to a resilient force of the spring; and a braking member for applying a resisting force to the ejection member in a direction opposite to the ejecting direction during the ejecting movement of the cartridge by the ejection member. In the above disk drive apparatus, the ejection member and the braking member are arranged such that the ejection member is not engaged with the braking member until the cartridge edge reaches an intermediate position of a stroke of the ejecting movement between the inserted position and the ejected position upon depression of the ejection button. In the above disk drive apparatus, the ejection member is provided with a first portion which is connected to the cartridge so as to eject the cartridge in the ejecting direction, and with a second portion which is engaged with the braking member so as to apply a resisting force to the ejection member in the opposite direction. According to the present invention, it is possible to smoothly and stably eject a disk cartridge to the intended outside position, so that an operator can easily take out the disk cartridge from the apparatus. It is possible to prevent the disk cartridge from leaping out or dropping due to the force of the shutter lever spring or the latch lever spring.

Other objects and further features of the present invention will become apparent from the following detailed description when read in conjunction with the accompanying drawings

DESCRIPTION OF THE PREFERRED EMBODIMENTS

A description will be given of a magnetic disk drive apparatus to which a first embodiment of the ejection mechanism according to the present invention is applied.

FIGS. 1 through 5 show a magnetic disk drive apparatus 1 to which the first embodiment of the present invention is applied. This disk drive apparatus 1 has a frame 2 and a holder 5 mounted on the frame 2. A disk cartridge 4 accommodating a magnetic disk is inserted to the holder 5 in a direction "A" and ejected from the holder 5 in a direction "B".

Figure 6:
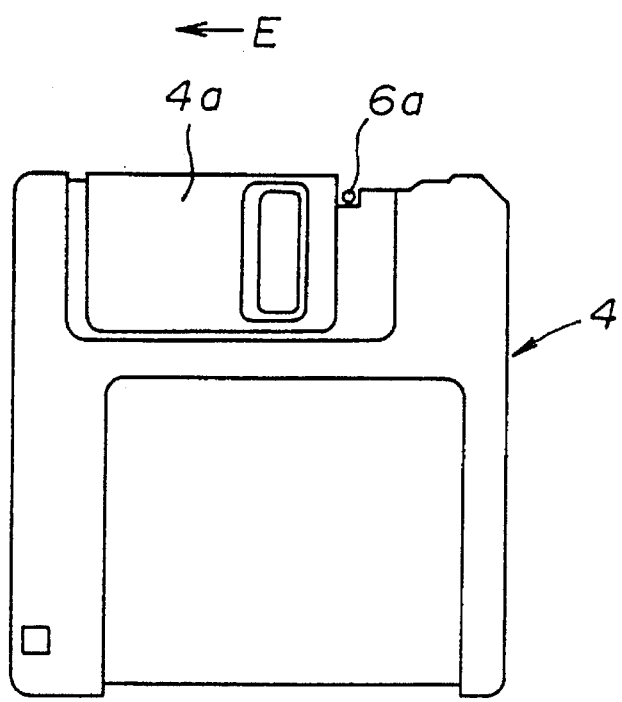
FIG. 6 is a plan view showing a disk cartridge which is inserted in and ejected from the holder.

The disk cartridge 4 is shown in FIG. 6. As shown in FIG. 6, the disk cartridge 4 includes a magnetic disk accommodated therein and a shutter 4a. The shutter 4a is movable in a direction "E" in FIG. 6.

Figure 2:
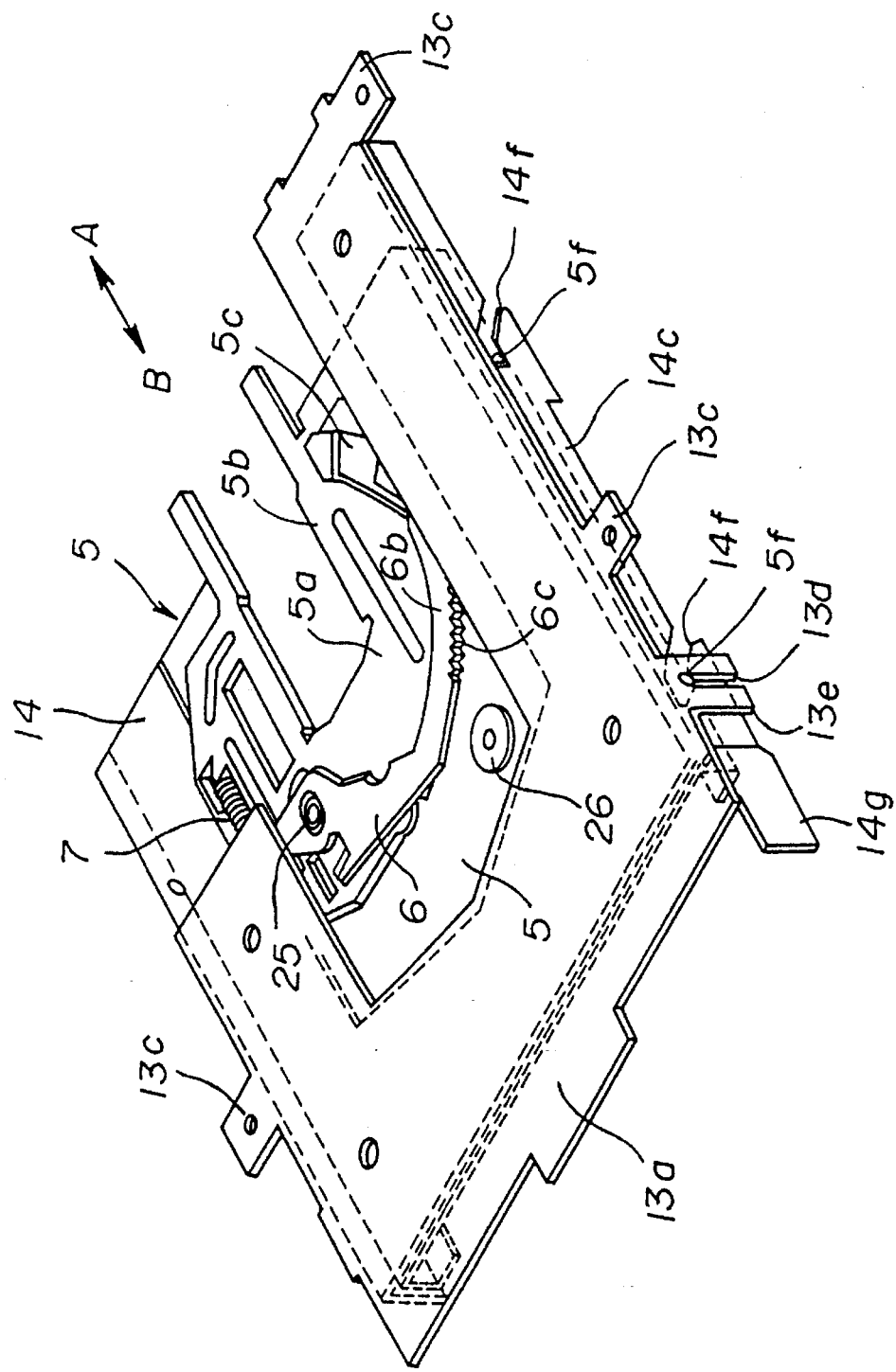
FIG. 2 is a perspective view showing a main assembly of the disk drive apparatus in which a holder, a slider, and a cover member are assembled.
Figure 3:
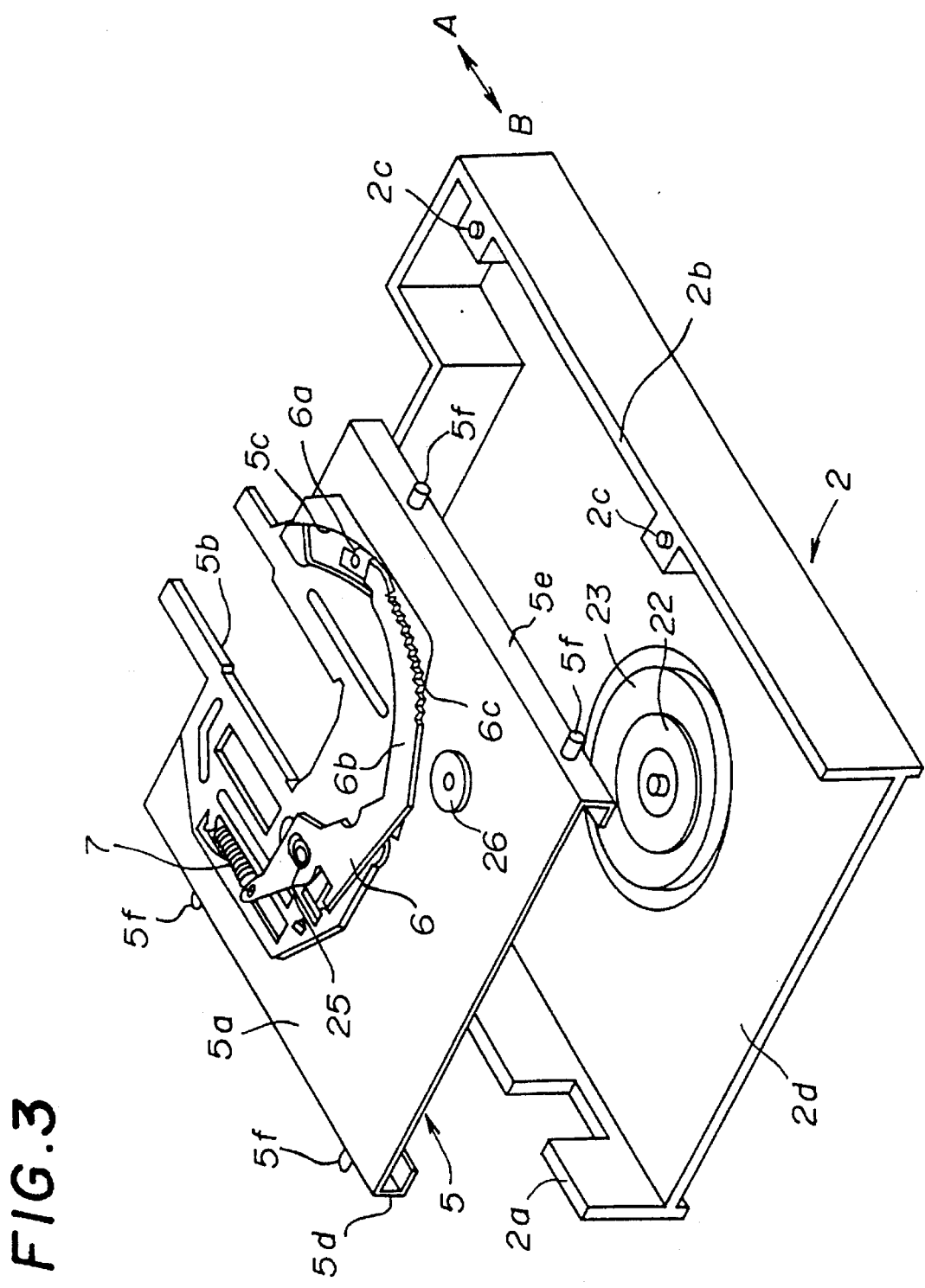
FIG. 3 is an exploded view showing the holder and a frame of the disk drive apparatus which are disassembled.

FIG. 2 shows a main assembly of the disk drive apparatus 1 in which the holder 5, a slider 14, and a cover member 13 are assembled. FIG. 3 shows the holder 5 and the frame 2 which are disassembled. The holder 5 has a main plate 5a, and a rectangular opening 5b and a bow-shaped hole 5c are formed in the main plate 5a. The holder 5 is arranged such that it is lowered in the apparatus 1 when the cartridge 4 is placed at the recording/reproducing position while it is raised relative to the frame 2 when the cartridge 4 is ejected from the holder 5. A magnetic head unit 8 of the disk drive apparatus 1 can enter the opening 5b of the holder 5 when the cartridge 4 is placed at the recording/reproducing position.

A shutter lever 6 is rotatably supported on the main plate 5a by a supporting shaft 25. The shutter lever 6 has a connecting pin 6a at the end of the shutter lever 6, an L-shaped arm 6b, and a toothed portion 6c on the outer periphery of the arm 6b. The connecting pin 6a extends from the hole 5c of the holder 5 in a vertical downward direction (toward the frame 2). When the disk cartridge 4 is inserted in the holder 5 in the direction "A", the connecting pin 6a is connected to the shutter 4a so as to open the shutter 4a in the direction "E" in FIG. 6. The shutter lever 6 constitutes a main part of the ejection mechanism according to the present invention.

A coil spring 7 is mounted on the main plate 5a to rotate the shutter lever 6 clockwise around the shaft 25 by the actuating force of the spring 7.

A braking member 26 is mounted on the main plate 5a. The braking member 26 and the shutter lever 6 are arranged on the holder 5 such that the toothed portion 6c of the shutter lever 6 is engaged with the braking member 26 when the disk cartridge 4 reaches an intermediate position of a stroke of the ejecting movement by the shutter lever 6. When the toothed portion 6c is engaged with the braking member 26, the braking member 26 applies a resisting force to the shutter lever 6 in the direction "A" opposite to the ejecting direction "B" during the ejecting movement of the cartridge 4. However, after the disk cartridge 4 is inserted in the holder 5, the toothed portion 6c is not engaged with the braking member 26 as shown in FIG. 4 and no force is applied to the shutter lever 6.

Figure 4:
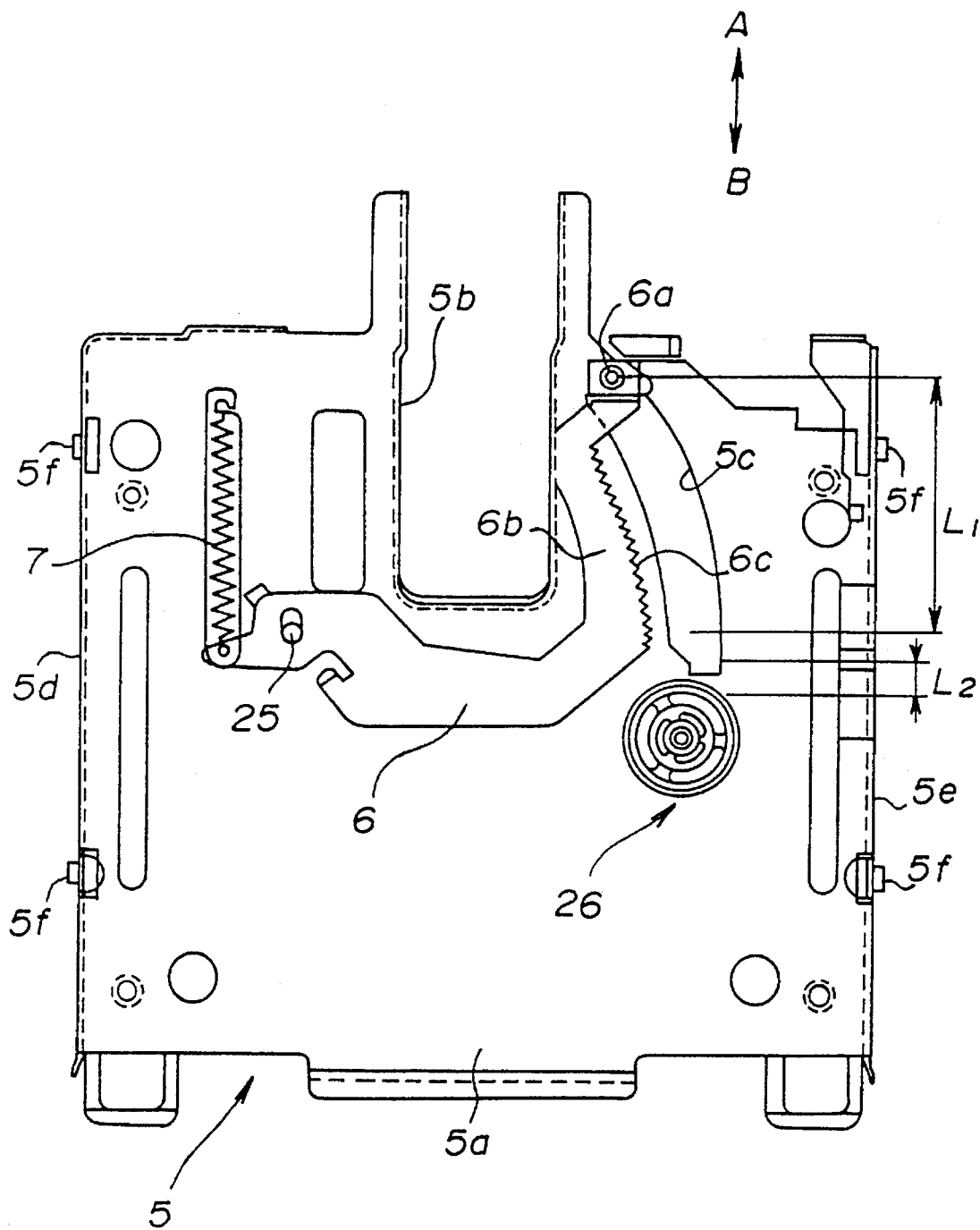
FIG. 4 is a plan view showing the ejection mechanism when a disk cartridge is inserted in the inside of the apparatus.

FIG. 4 shows the ejection mechanism when the disk cartridge 4 is inserted in the holder 5. As shown in FIG. 4, the front-side edge of the toothed portion 6c is distant from the braking member 26 by a distance indicated by the arrow "L2" in FIG. 4 when the shutter lever 6 is located at the position shown in FIG. 4. The stroke of the connecting pin 6a when the disk cartridge 4 is ejected from the holder 5 is indicated by the arrow "L1" in FIG. 4. When the disk cartridge 4 is moved to the intermediate position of its stroke, the connecting pin 6a is at an intermediate position of the stroke "L1". The movement of the connecting pin 6a is accelerated until the pin 6a reaches the intermediate position of the stroke "L1" but the ejecting speed of the disk cartridge is reduced because a resisting force is applied to the shutter lever 6 in the direction "A" due to the engagement of the toothed portion 6a with the braking member 26 after the pin 6a passes the intermediate position of the stroke "L1".

Figure 5:
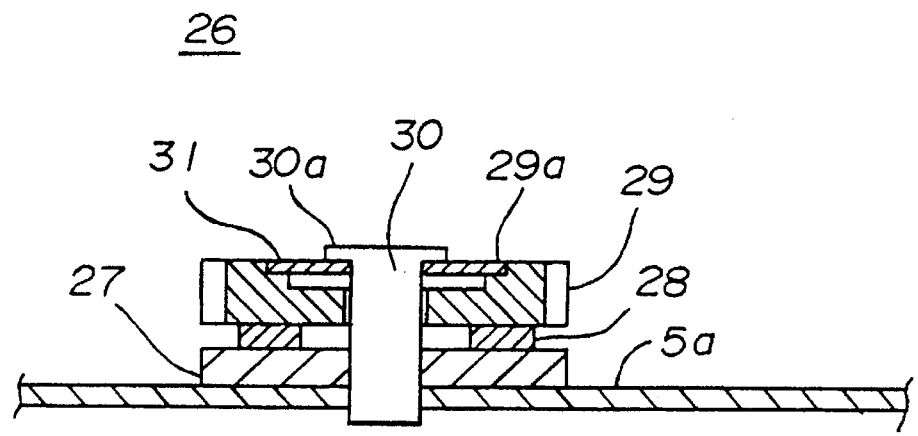
FIG. 5 is a sectional view showing a braking member mounted on the holder.

FIG. 5 shows the braking member 26 mounted on the holder 5. A base 27 of the braking member 26 is fixed onto the main plate 5a of the holder 5. A ring-shaped felt member 28 as a friction member is attached to the base 27 with an adhesive. A gear 29 having a toothed portion on the periphery thereof is rotatably supported on the felt member 28 by a supporting pin 30. The leading edge of the supporting pin 30 is crimped on the reverse surface of the main plate 5a so that the gear 29 is secured to the base 27 via the felt member 28 when the gear 29 is rotated on the felt member 28. A conical spring washer 31 is placed between a recess 29a of the gear 29 and a head 30a of the pin 30 so that the washer 31 is compressed by the head 30a against the gear 29, and the sectional shape of the washer 31 is made flat. Thus, the felt member 28 is depressed by the gear 29 due to the depressing force from the washer 31.

During the ejecting movement of the disk cartridge 4, the shutter lever 6 is rotated clockwise due to the resilient force of the spring 7, and the toothed portion 6c meshes with the gear 29. As described above, the rotating speed of the shutter lever 6 is reduced since the braking member 26 applies a resisting force to the shutter lever 6 in the direction "A".

This resisting force is derived from the friction between the gear 29 and the felt member 28.

The braking member 26 which utilizes the friction between the gear 29 and the felt member 28 can be easily constructed with a small thickness. Thus, the above mentioned braking member 26 can be mounted on the main plate 5a of the holder 5 without causing interference with other parts of the disk drive apparatus.

Figure 8:
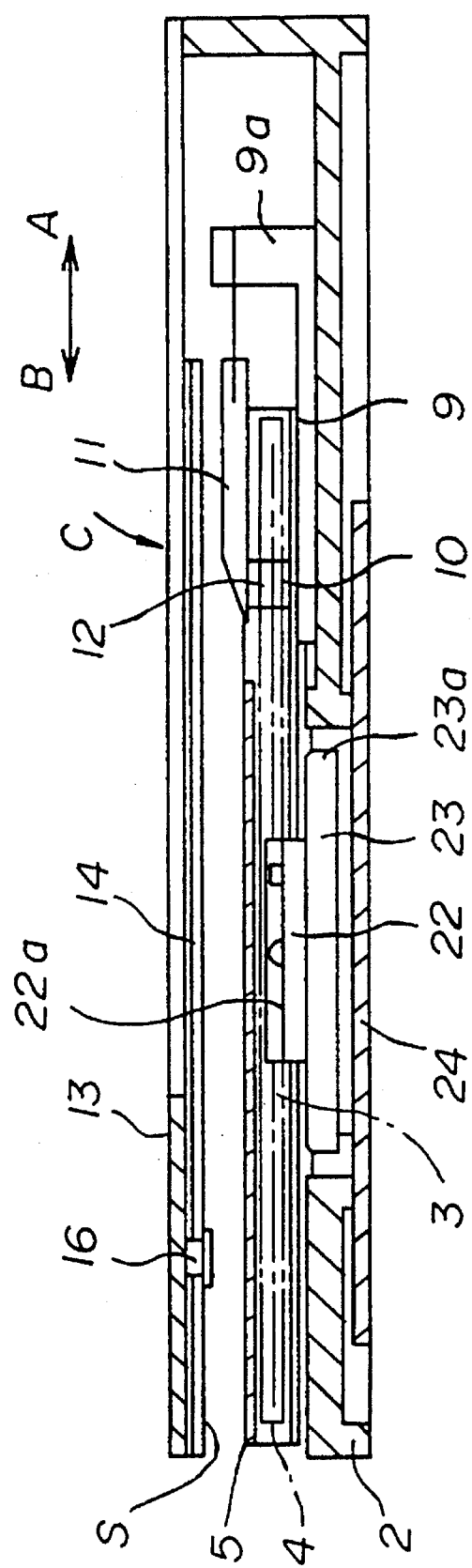
FIG. 8 is a sectional side view showing the disk drive apparatus in which the disk cartridge is placed at the recording/reproducing position.
Figure 11:
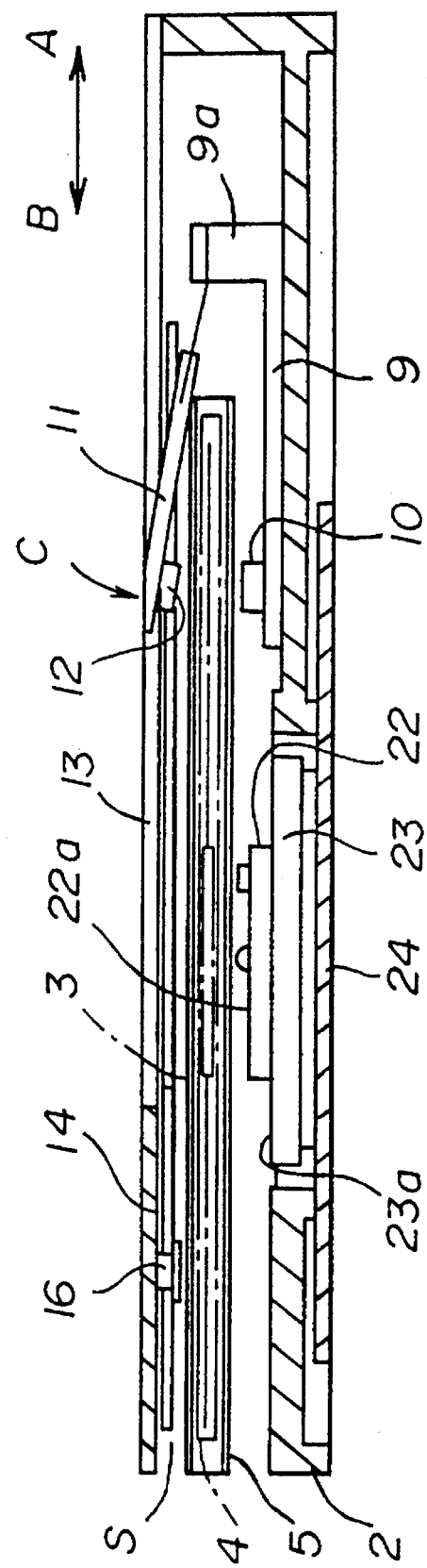
FIG. 11 is a sectional side view showing the disk drive apparatus when the disk cartridge is inserted in the holder.

FIG. 8 shows the side of the disk drive apparatus in which the disk cartridge is placed at the recording/reproducing position after it is inserted in the holder. FIG. 11 shows the side of the disk drive apparatus in which the disk cartridge is inserted in the holder. The magnetic head unit 8 includes a carriage 9, a lower head 10 mounted on the carriage 9, an arm 11 rotatably supported on a base portion 9a of the carriage 9, and an upper head 12 mounted on a bottom surface of the arm 11 at the end thereof. The carriage 9 is movably arranged on the frame 2 such that the upper and lower heads 12 and 10 are slidable on the magnetic disk 3 of the cartridge 4 in the radial direction of the disk (which is either the direction "A" or the direction "B").

The carriage 9 is engaged with a lead screw (not shown) rotated by a stepping motor (not shown). In accordance with the rotation of the lead screw, the carriage 9 is moved relative to the stationary frame 2 in either the direction "A" or the direction "B". Thus, the upper and lower heads 12 and 10 are moved, together with the carriage 9, on the disk 3 in the tracking direction.

Figure 1:
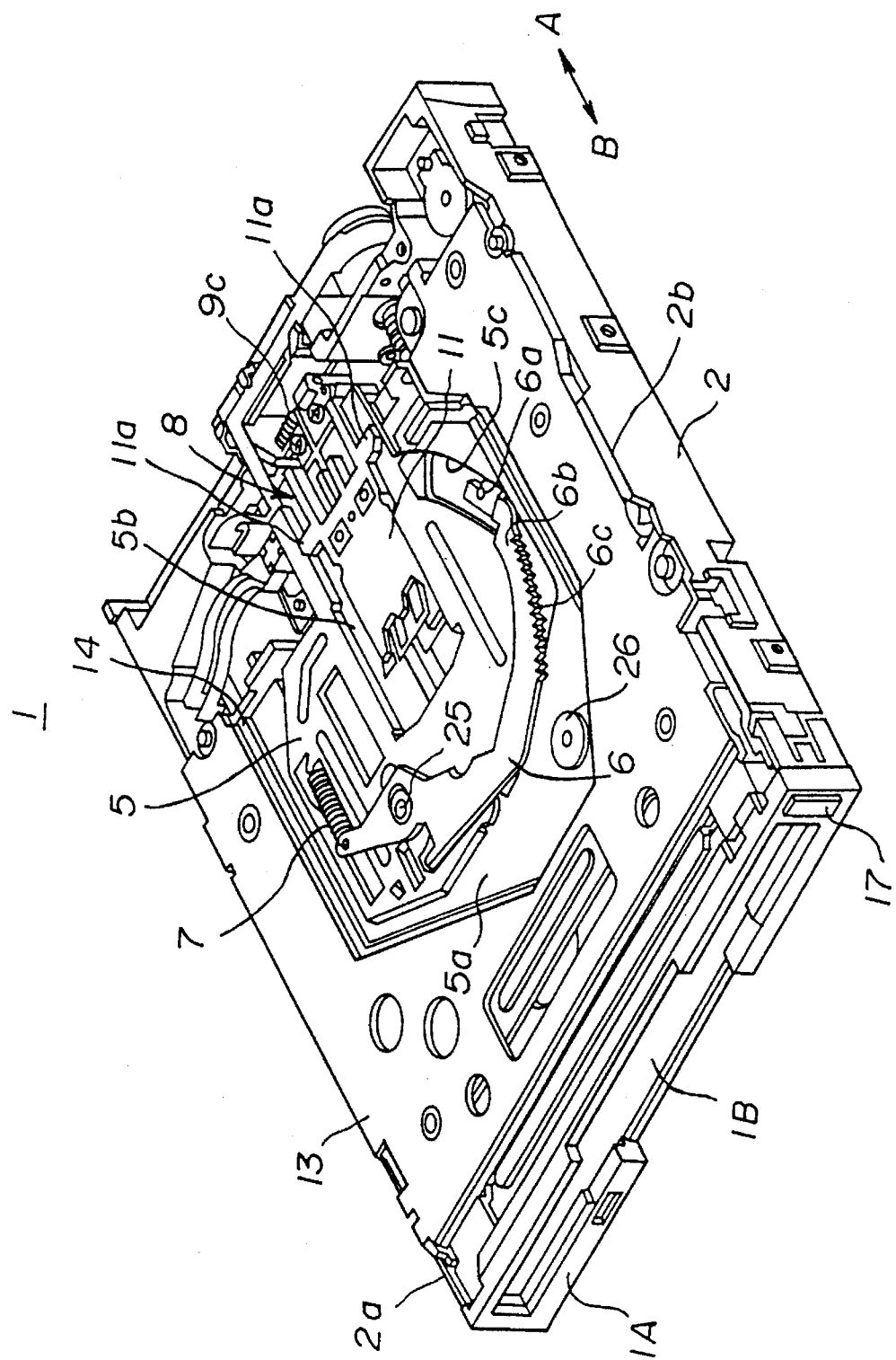
FIG. 1 is a perspective view showing a disk drive apparatus to which a first embodiment of the ejection mechanism according to the present invention is applied.

The arm 11 is actuated in a direction "C" (indicated in FIGS. 8 and 11) by a resilient force of a torsion spring 9c (shown in FIG. 1) mounted on the base portion 9a. As shown in FIG. 1, the arm 11 is provided with a pair of contact portions 11a extending from both the sides of the arm 11. The contact portions 11a are brought into contact with the main plate 5a of the holder 5. Before the cartridge 4 is inserted in the holder 5, the holder 5 is placed at the insertion position shown in FIG. 11, and the arm 11 is rotated by the holder 5 to a higher position shown in FIG. 11. At this time, the upper head 12 on the arm 11 is separated from the lower head 10 on the carriage 9.

Figure 9:
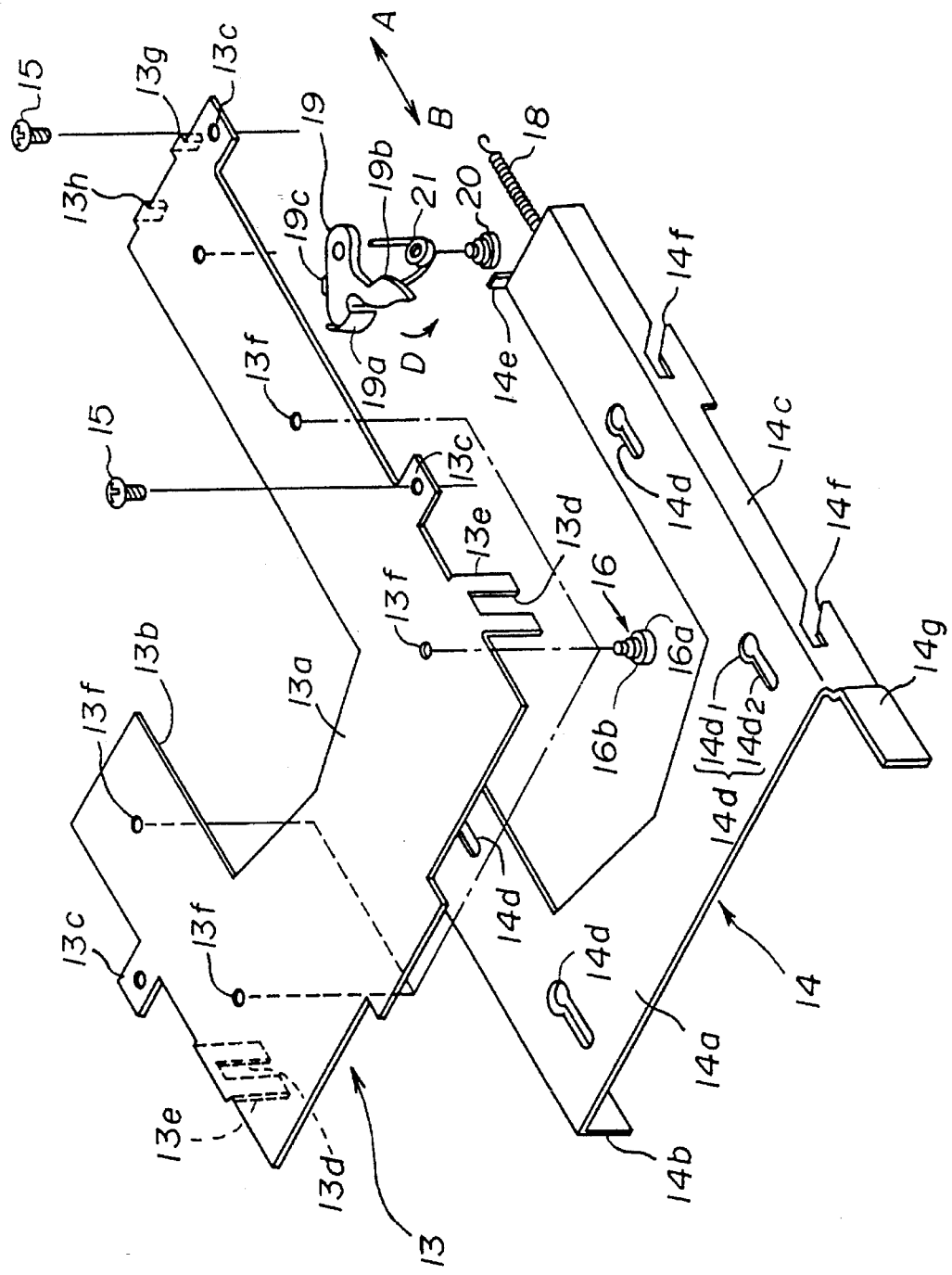
FIG. 9 is an exploded view showing the cover member and the slider before they are assembled together.

The cover member 13 with which the upper surface of the holder 5 is partially covered is secured to the frame 2 by fastening screws to threaded holes 2c on side edges 2a and 2b of the frame 2 as shown in FIG. 3. As shown in FIG. 9, the cover member 13 includes a J-shaped main plate 13a, mounting portions 13c extending from the sides of the main plate 13a, and guide portions 13e with guide grooves 13d. The cover member 13 is formed with a cut-out portion 13b, enabling the shutter lever 6 to be mounted on the holder 5. Machine screws 15 are secured to holes of the mounting portions 13c. The holder 5 has side surfaces 5d and 5e each of which two laterally projecting pins 5f are formed on. The two front-side pins 5f are loosely fitted in the guide grooves 13d of the guide portions 13e. When the holder 5 is raised and lowered relative to the frame 2 as described below, the pins 5f of the holder 5 are guided along the grooves 13d.

The slider 14 is mounted on the holder 5 between the cover member 13 and the main plate 5a as shown in FIG. 9. The slider 14 includes a U-shaped main plate 14a, and side plates 14b and 14c bent at side edges of the main plate 14a. Four slots 14d are formed on the main plate 14a. Four guide pins 16 are fitted in holes 13f formed on the main plate 13a of the cover member 13. The guide pins 16 are placed into the slots 14d. Each of the guide pins 16 is formed with a base portion 16a and an upper portion 16b with a reduced diameter. Each of the slots 14d is formed with a hole 14d1 with an enlarged diameter and a guide opening 14d2. The base portion 16a of the guide pin is connected to the hole 14d1, and the reduced-diameter portion 16b of the guide pin is slidably fitted in the guide opening 14d2. Thus, the slider 14 is slidably supported by the guide pins 16 projecting downward from the cover member 13, and the slider 14 is movable in either the direction "A" or the direction "B".

At the rear end of the main plate 14a of the slider 14, an upwardly extending projection 14e is formed. On the side plates 14b and 14c of the slider 14, slanting grooves 14f are formed. The pins 5f of the holder 5 are fitted in the slanting grooves 14f, respectively. A mounting portion 14g to which an ejection button 17 is secured is formed extending from the front end of the slider 14.

A compression spring 18 is provided to actuate the slider 14 in the direction "B" due to a resilient force of the spring 18. One end of the spring 18 is connected to the rear end of the slider 14, and the other end of the spring 18 is connected to a downwardly extending projection 13g formed at the rear end of the cover member 13. The slider 14 is moved in the direction "B" by the spring 18 before the disk cartridge is inserted. When the ejection button 17 is depressed, the slider 14 is moved in the direction "A" against the force of the spring 18.

A latch lever 19 is rotatably supported on the cover member 13 by a pin 20. The latch lever 19 includes a contact portion 19a and a connecting portion 19b. The leading edge of the disk cartridge 4 comes in contact with the contact portion 19a when the cartridge is inserted. The connecting portion 19b of the latch lever 19 is connected to the projection 14e of the slider 14. A torsion spring 21 is connected to a downwardly extending projection 13h formed at the rear end of the main plate 13a of the cover member 13. The latch lever 19 is actuated in a direction "D" in FIG. 9 by the torsion spring 21.

Upon depression of the ejection button 17 in the direction "A", the slider 14 is moved in the direction "A" relative to the cover member 13. Due to connection of the spring 21 to the cover member 13, the latch lever 19 is rotated anti-clockwise in the direction "D" by the resilient force of the spring 21. The connecting portion 19b of the latch lever 19 is connected to the projection 14e of the slider 14, and the slider 14 is fixed by the latch lever 19.

In the above described first embodiment, the cover member 13 and the slider 14 are assembled with the latch lever 19, the compression spring 18, and the torsion spring 21, as shown in FIG. 9. Thus, the time needed for the assembly process of the disk drive apparatus according to the present invention can be reduced by preparing an assembly of the cover member and the slider mentioned above.

Figure 10:
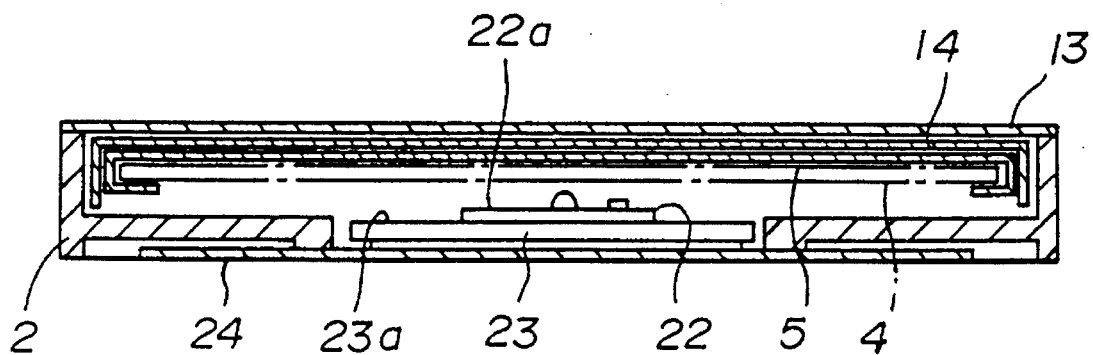
FIG. 10 is a sectional front view showing the disk drive apparatus when the disk cartridge is inserted in the holder.

FIGS. 10 and 11 show the disk drive apparatus when the disk cartridge is inserted in the holder. The holder 5 is raised to the insertion position before the disk cartridge is inserted. As shown in FIG.11, the arm 11 and the upper head 12 mounted on the arm 11 are also raised because the main plate 5a of the holder 5 is brought into contact with the contact portions 11a. Therefore, a clearance "S" (indicated in FIG. 11) between the holder 5 and the cover member 13 when the disk cartridge is inserted in the holder is required so as to upwardly rotate the arm 11 (in the vertical direction opposite to the direction "C"). The slider 14 mentioned above is provided within the clearance "S" between the holder 5 and the cover member 13.

In the above described first embodiment, the slider 14 is provided within the clearance "S", and the insertion position of the holder 5 can be set to a relatively low position relative to the frame 2. Thus, it is possible that the disk drive apparatus according to the present invention has a relatively small thickness.

The disk cartridge 4 is placed at the recording/reproducing position after it is inserted in the holder 5. The magnetic disk 3 in the cartridge 4 at this position stays on a turntable 22, as shown in FIG. 8. The turntable 22 is rotated by a motor 23 at a constant speed. A rotor 23a of the motor 23 is provided on a board 24 which is secured to the bottom surface of the frame 2. A driving coil (not shown) of the motor 23 is formed on the board 24. The turntable 22 is mounted on the rotor 23a. As shown in FIG. 3, the motor 23 is embedded in the frame 2, and the coil of the motor 23 is formed on the board 24. Thus, the disk drive apparatus is designed so as to have a relatively small thickness. In addition, the turntable 22 is provided with a remarkably low position relative to the frame 2 such that the top surface 22a of the turntable 22 is set to a position which is almost the same as the height of the top surface 2d of the frame 2.

Next, the operation of the disk drive apparatus to which the first embodiment of the ejection mechanism mentioned above is applied will be described. Before a disk cartridge is inserted in the holder, the slider 14 is already moved in the direction "A" to a rearward position and fixed by the latch lever 19 at the rearward position. The arm 11 and the upper head 12 are raised by the holder 5 to a higher position.

Suppose that a disk cartridge 4 is inserted from an insertion opening 1B of the front bezel 1A into the holder 5 as indicated by a dotted line in each of FIGS. 10 and 11. The leading edge of the cartridge 4 is brought into contact with the contact portion 19a of the latch lever 19. As the contact portion 19a is depressed in the direction "A" due to insertion of the cartridge 4, the latch lever 19 is rotated clockwise against the actuating force of the torsion spring 21, and the connecting portion 19b is separated from the projection 14e of the slider 14. The slider 14 is thus released from the latch lever 19, and the slider is moved in the direction "B" back to the forward position due to the actuating force of the compression spring 18. The movement of the slider 14 is stably performed as the slider 14 is supported by the guide pins 16.

Figure 7:
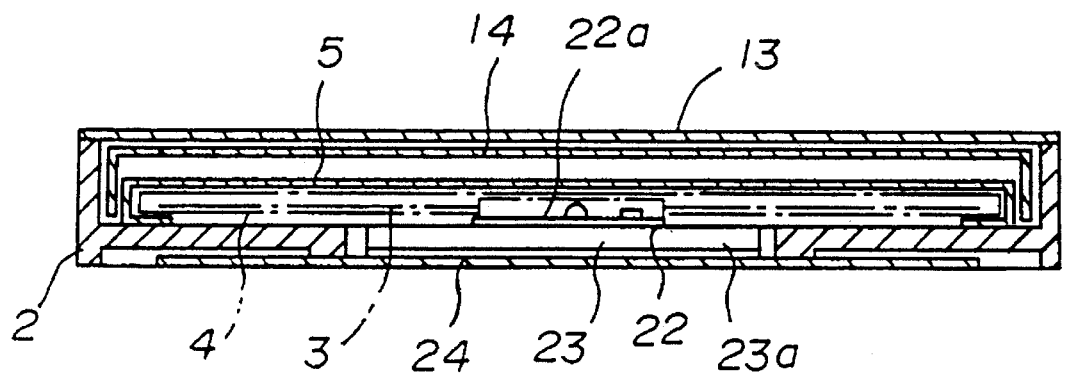
FIG. 7 is a sectional front view showing the disk drive apparatus in which a disk cartridge is placed at a recording/reproducing position.

The slanting grooves 14f are formed in each of the side plates 14b and 14c of the slider 14, and the pins 5f of the holder 5 are fitted in the grooves 14f. As the slider 14 is moved in the direction "B" relative to the holder 5, the holder 5 is lowered due to the connection of the pins 5f and the grooves 14f. The disk cartridge 4 in the holder 5 is thus placed at the recording/reproducing position shown in FIGS. 7 and 8 so that the magnetic disk 3 stays on the turntable 22.

When the holder 5 is lowered to the recording/reproducing position, the arm 11 is rotated downward due to the actuating force of the torsion spring 9c, and the upper head 12 on the arm 11 comes into contact with the magnetic disk 3 on the lower head 10. The shutter 4a of the disk cartridge 4 shown in FIG. 6 is opened by the connecting pin 6a of the shutter lever 6 after the insertion of the cartridge 4. The shutter lever 6 is rotated clockwise against the force of the spring 8 so that the shutter 4a is moved by the connecting pin 6a in the direction "E". Thus, at the same time as the disk cartridge 3 stays on the turntable 22, the upper and lower heads 12 and 10 are brought into contact with the magnetic disk 3.

The toothed portion 6c of the shutter lever 6 is engaged with the gear 29 of the braking member 26 during the inserting movement of the disk cartridge. If a disk cartridge is abruptly inserted with an excessively great operating force, the inserting speed of the cartridge 4 can be attenuated due to the frictional force of the braking member 26 (the friction between the gear 19 and the felt member 28). The inserting movement of the cartridge can be stably performed due to the engagement of the toothed portion 6c and the braking member 26 even when a great operating force is applied to the disk cartridge 4 when it is inserted.

Adequately before the recording/reproducing position of the holder 5 is reached upon insertion of the disk cartridge, the toothed portion 6c of the shutter lever 6 separates from the gear 29 of the braking member 26. Thus, only a small operating force is needed for the operator at the final stage of the insertion of the disk cartridge.

During the recording/reproducing operations of the disk drive apparatus, the turntable 22 is rotated by the motor 23, and the magnetic disk 3 is rotated on the turntable 22 so that information is read from and written to the magnetic disk 3 by means of the upper and lower heads 12 and 10.

Next, the ejecting operation of the first embodiment described above will be described. In order to eject the disk cartridge 4 from the inside of the apparatus 1, the ejection button 17 of the front bezel 1A is depressed in the direction "A" by an operator. The slider 14 is moved in the direction "A" to the rearward position upon depression of the ejection button 17, and the holder 5 is raised to the insertion position. As the slider 14 is moved to the rearward position; the latch lever 19 is rotated in the direction "D" due to the force of the torsion spring 21. The connecting portion 19b of the latch lever 19 is connected to the projection 14e of the slider 14. Thus, the disk cartridge 4 is pressed by the contact portion 19a of the latch lever 19, and the ejecting movement of the cartridge starts.

At the same time as the latch lever 19 is rotated in the direction "D", the shutter lever 6 is rotated clockwise around the shaft 25 due to the actuating force of the spring 7. The disk cartridge 4 is initially moved in the ejecting direction "B" by a resultant force of the force of the spring 7 (received from the connecting pin 6a) and the force of the spring 21 (received from the contact portion 19a). In addition, when the ejecting movement of the cartridge 4 starts, the toothed portion 6c of the shutter lever 6 does not mesh with the braking member 26. Thus, the ejecting speed of the cartridge 4 accelerates due to the resultant force by the spring 7 and the spring 21.

Figure 12:
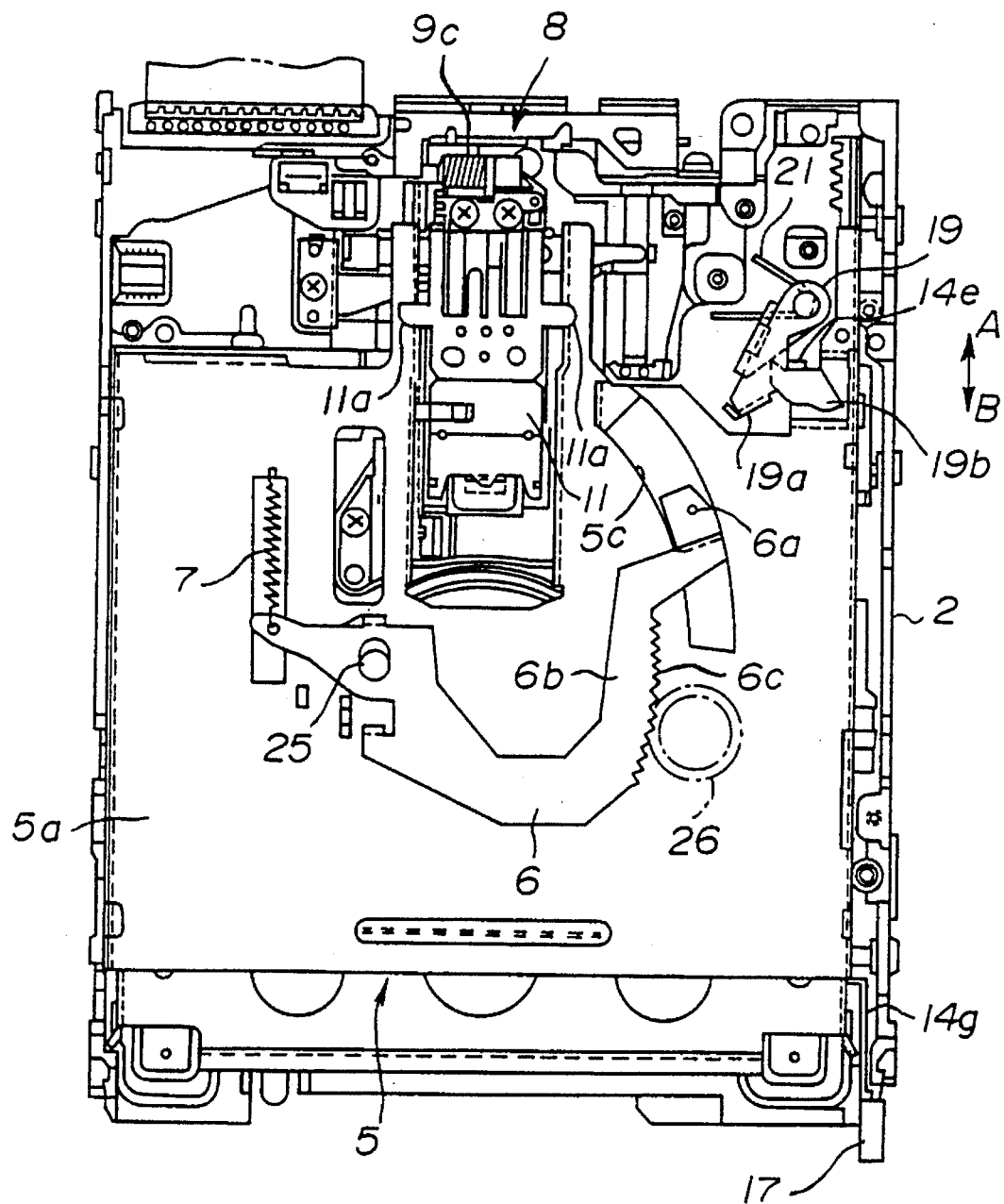
FIG. 12 is a plan view showing the disk drive apparatus when the disk cartridge is being moved in an ejecting direction.

After the displacement of the cartridge 4 exceeds the stroke of the latch lever 19 in the direction "B", the cartridge 4 is moved due to the force received from the shutter lever 6 only. If a certain displacement of the cartridge 4 is reached when it is ejected, the toothed portion 6c of the shutter lever 6 meshes with the gear 29 of the braking member 26 as shown in FIG. 12. Since the friction between the gear 29 and the felt member 28 is transferred from the braking member 26 to the toothed portion 6c, the rotating force of the shutter lever 6 is attenuated.

Figure 13:
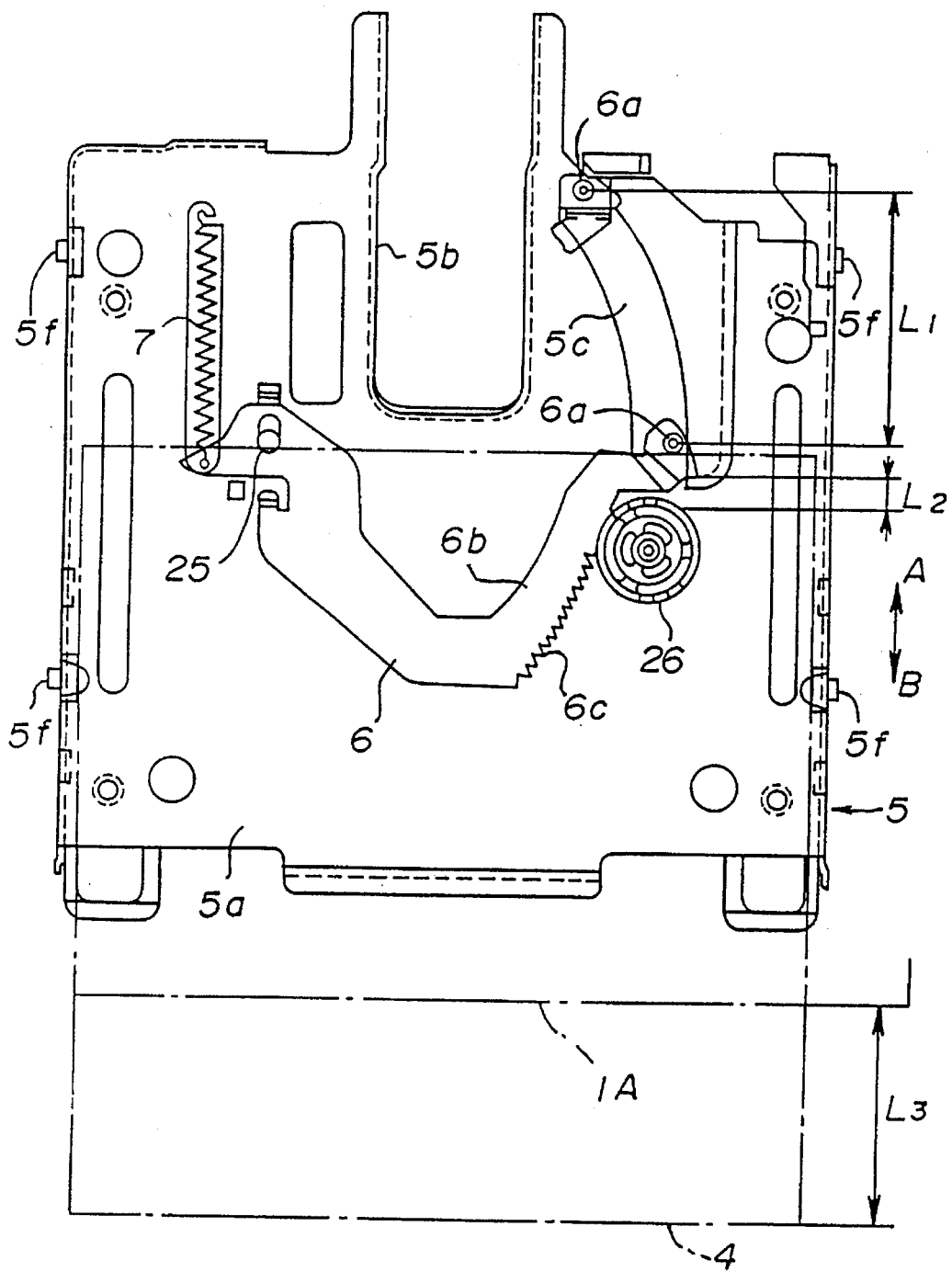
FIG. 13 is a plan view showing the ejection mechanism after the disk cartridge is ejected from the holder.

The disk cartridge 4 can be smoothly and reliably ejected from the holder 5 as the shutter lever 6 is rotated clockwise from the position shown in FIG. 12 to the position shown in FIG. 13 at a decreasing speed due to the engagement with the braking member 26. When the disk cartridge 4 is ejected from the holder 5, the edge of the cartridge stops at a prescribed outside position where the cartridge edge is distant from the front bezel 1A by a distance "L3" (approximately 30 mm) as shown in FIG. 13. The operator can easily take out the disk cartridge after it is ejected from the inside of the disk drive apparatus. In the disk drive apparatus having the ejection mechanism according to the present invention, it is possible to prevent the disk cartridge from leaping out or dropping due to the force of the shutter lever spring or the latch lever spring. The undesired actions of the ejection mechanism due to variations of the shutter lever spring or the latch lever spring can be eliminated by the functions of the braking member 26.

Figure 14:
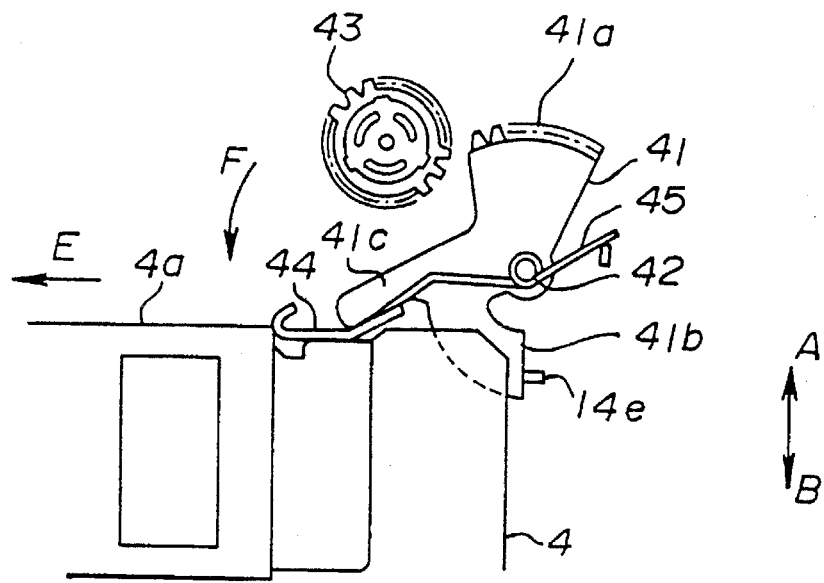
FIG. 14 is a plan view showing a second embodiment of the ejection mechanism according to the present invention.
Figure 15:
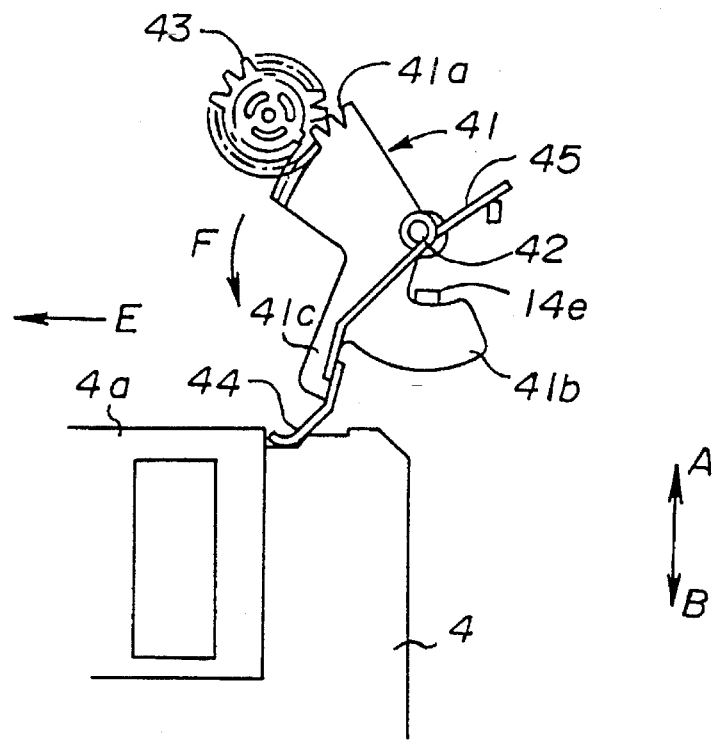
FIG. 15 is a plan view showing the ejection mechanism for explaining an ejecting operation of the ejection mechanism of the second embodiment.

FIGS. 14 and 15 show a second embodiment of the ejection mechanism according to the present invention. In the second embodiment shown in FIGS. 14 and 15, a latch lever 41 and a braking member 43 are provided instead of the ejection mechanism of the first embodiment. The latch lever 41 is rotatably supported by a supporting shaft 42 which is in turn mounted on the frame 2. The latch lever 41 includes a toothed portion 41a on an arch-like peripheral edge of the lever 41, a connecting portion 41b, and an arm portion 41c. The braking member 43 is mounted on the frame 2. The braking member 43 is constructed in the same manner as the braking member 26 shown in FIG. 5, and applies a resisting force to the latch lever 41 in the direction "A", due to the friction between the gear and the felt member, when the latch lever 41 is engaged with the braking member 34.

Similarly to the first embodiment previously described, the latch lever 41 and the braking member 43 are arranged such that the toothed portion 41a is engaged with the braking member 43 at an intermediate position of the stroke of the ejecting movement of the disk cartridge. The connecting portion 41b is connected to the projection 14e of the slider 14. The arm portion 41c extends to the inside of the holder 5, and is provided with a leaf spring 44. The leaf spring 44 extending in the longitudinal direction of the arm portion 41c has a leading edge, and the edge of the leaf spring 44 is formed such that the leaf spring edge is connected to the shutter 4a of the disk cartridge 4 after the cartridge is inserted in the holder 5, so as to open the shutter 4a of the cartridge.

The latch lever 41 is actuated in a direction "F" by a torsion spring 45. When the disk cartridge 4 is inserted in the holder 5, the cartridge edge is brought into contact with the edge of the leaf spring 44. As the disk cartridge 4 is moved further in the direction "A", the latch lever 41 is rotated clockwise around the shaft 42 against the actuating force of the spring 45 by the disk cartridge. Thus, the shutter 4a of the cartridge is opened in the direction "E" by the leaf spring 44 as shown in FIG. 14.

The toothed portion 41a is engaged with the braking member 26 during the inserting movement of the disk cartridge, and a resisting force is applied from the braking member 43 to the latch lever 41. If a disk cartridge is abruptly inserted with an excessively great operating force, the insertion speed of the cartridge can be reduced due to the frictional force of the braking member 43 (the friction between the gear and the felt member). Thus, the insertion movement of the cartridge can be stably performed due to the engagement of the toothed portion 41a and the braking member 43 when a great operating force is applied to the disk cartridge upon insertion thereof.

Before the recording/reproducing position of the holder 5 is reached upon insertion of the disk cartridge, the toothed portion 41a of the latch lever 41 separated from the braking member 43. Thus, only a small operating force is needed for the operator at the final stage of the insertion of the disk cartridge.

In order to eject the disk cartridge from the holder, the ejection button 17 is depressed in the direction "A". The slider 14 is moved in the direction "A" to the rearward position upon depression of the ejection button 17, and the holder 5 is raised to the insertion position. As the projection 14e of the slider 14 is moved to the rearward position, the projection 14e separated from the connecting portion 41b. The latch lever 41 is rotated clockwise around the shaft 42 by the actuating force of the torsion spring 45, and the disk cartridge is pressed in the direction "B" by the contact portion 41c of the latch lever 41. Since the toothed portion 41a is, at this time, not engaged with the braking member 43, the rotation of the latch lever 41 is accelerated and the disk cartridge is moved in the ejecting direction "B".

When a certain displacement of the disk cartridge is reached upon ejection thereof, the toothed portion 41a is engaged with the braking member 43 as shown in FIG. 15. Since the friction between the gear and the felt member is transferred from the braking member 43 to the latch lever 41, the rotating speed of the latch lever 41 is reduced.

Thus, the disk cartridge 4 can be smoothly and reliably ejected from the holder 5 as the latch lever 41 is rotated clockwise at a decreasing speed due to the engagement with the braking member 43. After the disk cartridge 4 is ejected from the holder 5, the edge of the cartridge stops at a prescribed outside position. The operator can easily take out the disk cartridge after it is ejected from the inside of the disk drive apparatus. In the disk drive apparatus having the ejection mechanism of the second embodiment, it is possible to prevent the disk cartridge from leaping out or dropping due to the force of the torsion spring of the latch lever. The undesired actions of the ejection mechanism due to variations of the latch lever spring can be eliminated by the function of the braking member 43.

In the above described disk drive apparatus, it is possible to smoothly and stably eject a disk cartridge to the intended outside position, so that an operator can easily take out the disk cartridge from the apparatus. It is possible to prevent the disk cartridge from leaping out or dropping due to the force of the shutter lever spring or the latch lever spring.

In the above described disk drive apparatus, the braking member utilizing the friction of the gear and the felt member is used for the ejection mechanism according to the present invention. However, the present invention is not limited to the above described embodiments. It is a matter of course that the existing oil damper utilizing the viscosity resistance or the existing air piston damper utilizing the pneumatic resistance can be used instead of the braking member described above.

Further, the present invention is not limited to the magnetic disk drive apparatus described above, and the ejection mechanism according to the present invention can also be applied to optical disk drive devices and magneto-optical disk drive devices without departing from the scope of the present invention.

What is claimed is:

1. A disk drive apparatus for recording information on a disk and for reproducing the information from the disk, said disk being accommodated in a cartridge capable of being inserted in said apparatus by movement in an insertion direction, said cartridge being ejected from said apparatus by movement in an ejecting direction opposite to said insertion direction, said cartridge having an edge which is leading when said cartridge is inserted in said apparatus by movement in said insertion direction, said apparatus comprising:

a movable holder in which the cartridge is inserted so that the leading edge of the cartridge is placed at an inserted position;

ejection means rotatably supported on said holder for ejecting the cartridge from the holder in said ejecting direction when an ejection button is depressed, so that the leading edge of the cartridge is placed at an ejected position, said ejection means having an arm assuming a first position when the cartridge is in the inserted position and a second position when the cartridge is in the ejected position, said arm being movable in an arcuate path extending between said first and second positions when said rotatably supported election means is actuated;

spring means connected to said ejection means for actuating said ejection means in the ejecting direction of movement due to a resilient force of said spring means; and braking means for applying a resisting force to said ejection means in a direction opposite to the direction of movement of the ejection means, said braking means being positioned proximate to said ejection means and comprising a supporting shaft means, an exterior member mounted on said shaft means and rotatable with respect thereto, and means for retarding the rotation of said exterior member about said shaft means;

said arm having an edge portion facing said braking means and moving past said braking means when said arm moves in said arcuate path, said edge portion including a curved first section having means for engaging said braking means when said arm moves through a first part of the arcuate path so that said braking means applies the resisting force to said ejection means, said edge portion having a second section that is configured to disengage from said braking means when said arm moves through a second part of the arcuate path, said resisting force applied during movement of said arm in said first part of the arcuate path occurring after the leading edge of the cartridge reaches an intermediate position between the inserted position and the ejected position upon depression of the ejection button and occurring before the leading edge of the cartridge reaches the intermediate position upon insertion of the cartridge toward the inserted position, said movement of said arm in said second part of the arcuate path, occurring after the leading edge of the cartridge reaches said intermediate position upon the insertion of the cartridge toward the inserted position and prior to the leading edge of the cartridge reaching said intermediate position upon the depression of the ejection button.

2. A disk drive apparatus according to claim 1, wherein said ejection means is provided with a portion which is connectable to the cartridge so as to eject the cartridge in the ejecting direction.

3. A disk drive apparatus according to claim 1, wherein said ejection means comprises a shutter lever rotatably supported on the holder for opening a shutter of the cartridge when the cartridge is inserted in the holder, said shutter lever including said arm, a connecting pin provided at an end of the arm, and a toothed portion on an outer edge portion of said arm comprising said engaging means of said first section of said arm, said connecting pin being connectable to the leading edge of the cartridge, said exterior member of said braking means being toothed so as to be engageable by said toothed portion of said arm.

4. A disk drive apparatus according to claim 1, wherein said spring means comprises a coil spring provided on the holder, said coil spring being connected at one end to the ejection means and connected at the other end to the holder.

5. A disk drive apparatus according to claim 1, wherein said first section of said arm of said election means is toothed to form said engaging means, and wherein said braking means comprises a a base fixed on the holder, a gear with a toothed portion on the exterior thereof forming said exterior member, said toothed portion of said gear being engageable with said toothed first section of said arm and a friction member provided between the base and the gear, said gear being rotatable around said supporting shaft means, and applying the resisting force to the ejection means in the opposite direction when said first section of said arm of said ejection means is engaged with said toothed portion of said gear.

6. A disk drive apparatus according to claim 5, wherein the resisting force is applied from the braking means to the ejection means through a frictional resistance between the gear and the friction member when the gear is rotated by the ejection means.

7. A disk drive apparatus according to claim 1, wherein said ejection means comprises a latch lever for latching a slider after the cartridge is inserted in the holder, said latch lever having a connecting portion connected to a projection of the slider so as to latch the slider, said latch lever having said arm extending to the inside of the holder so as to connect to the cartridge in the holder.

8. A disk drive apparatus according to claim 7, wherein said spring means comprises a torsion spring which rotatably actuates said latch lever in the ejecting direction, said torsion spring being connected at one end to a frame of the disk drive apparatus, and connected at the other end to the arm portion of the latch lever.

9. A disk drive apparatus according to claim 1, wherein said first section of said arm of said election means is toothed to form said engaging means, and wherein said braking means is supported on a frame of the disk drive apparatus, and said braking means comprises a base fixed on the frame and supporting said supporting shaft means, a rotatably supported gear with a toothed portion on the exterior thereof forming said exterior member, said gear being engageable with said toothed first section of said arm, and a friction member provided between the base and the gear, said gear being rotatable around said supporting shaft means, and applying the resisting force when said first toothed section of said arm of said ejection means is engaged with said toothed portion of said braking means.

10. A disk drive apparatus according to claim 1, further comprising a mechanism for lowering the holder to a recording/reproducing position after the cartridge is inserted in the holder, and for raising the holder from the recording/reproducing position to an insertion position before the cartridge is ejected from the holder.

\* \* \* \* \*